United States Patent [19]

Klatt et al.

[11] 4,311,232
[45] Jan. 19, 1982

[54] FETIMN ALLOY GRANULATE IN A PRESSURE CONTAINER FOR STORAGE OF HYDROGEN AND DEUTERIUM

[75] Inventors: Karl-Heinz Klatt; Helmut Wenzl, both of Jülich, Fed. Rep. of Germany

[73] Assignee: Kernforschungsanlage Jülich GmbH, Jülich, Fed. Rep. of Germany

[21] Appl. No.: 74,344

[22] Filed: Sep. 11, 1979

[30] Foreign Application Priority Data

Sep. 15, 1978 [DE] Fed. Rep. of Germany ....... 2840265

[51] Int. Cl.³ .......................... B01J 20/06; F17C 6/00; F17C 9/02; F17C 11/00
[52] U.S. Cl. ................................. 206/0.7; 220/88 R; 252/466 J; 252/471; 422/200
[58] Field of Search .............................. 206/0.7; 62/48; 422/200, 201; 55/74; 252/184, 466 J, 471; 423/248, 644, 648 R

[56] References Cited

U.S. PATENT DOCUMENTS 3,922,872 12/1975 Reilly et al. ......................... 423/248

FOREIGN PATENT DOCUMENTS 2607156 9/1977 Fed. Rep. of Germany .

OTHER PUBLICATIONS

"Operating Manual...", Strickland et al., Brookhaven Nat'l. Lab., pp. 1-31, and appendices, 2-1974.
"Verwendung...", Klatt et al., Zeitschrift für Metallkunde, vol. 69, 3-1978, No. 3, pp. 170-173.

Primary Examiner—Bradley Garris
Attorney, Agent, or Firm—Frishauf, Holtz, Goodman & Woodward

[57] ABSTRACT

Oxygen is incorporated into an FeTiMn granulate in an amount sufficient to form double oxides of titanium and manganese therein, but insufficient to form oxides containing iron. As the result, the granules are embrittled, favoring the formation of microcracks to such an extent that activation of the granules by hydrogen takes place, after initial evacuation, at room temperature, after which the granulate can be used in a pressure container for storage and discharge of hydrogen and/or deuterium over long periods of operation. The oxygen content is to be kept in an atomic ratio with reference to the manganese content of the alloy lying between 1:3 and 1:3.5 and the ratio of titanium not bound by formation of a metal oxide to the iron should be equal to or greater than 1:1 on an atomic basis, with the FeTi content of the alloy constituting 90 to 95% by weight of the alloy.

4 Claims, 1 Drawing Figure

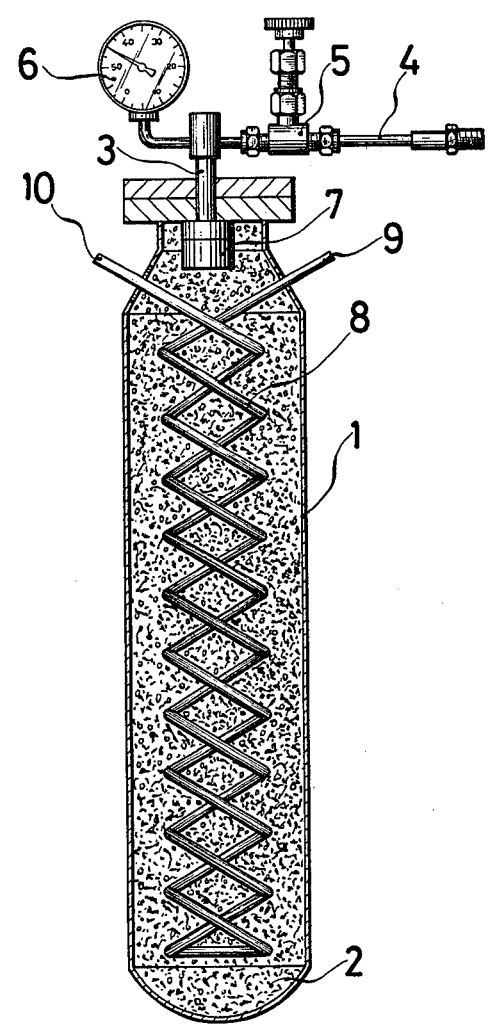

FETIMN ALLOY GRANULATE IN A PRESSURE CONTAINER FOR STORAGE OF HYDROGEN AND DEUTERIUM

This invention concerns the storage of hydrogen and deuterium and incidental purification thereof in a pressure container in the manner of the copending application of the Assignee of this application, Ser. No. 937,915, filed Aug. 30, 1978, now abandoned, and more particularly an improved iron-titanium-manganese alloy granulate in a pressure container, preferably of the type disclosed in said copending application. Pressure containers with the granulate of the invention are useful for storage of hydrogen and/or deuterium and, as disclosed in said copending application, can be used also for purification of the hydrogen or deuterium so stored and, furthermore, as disclosed in another copending application owned by the Assignee of the present application, Ser. No. 21,247, filed Mar. 15, 1979, now abandoned, are useful also for preparing a gas mixture containing HD from $H_2$ and $D_2$.

The use of alloys containing iron and titanium for storage of hydrogen, $H_2$, and/or deuterium, $D_2$, is known. The use of a granulate of an alloy containing iron and titanium in equal atomic ratio has been found particularly suitable for absorbing the $H_2$ or $D_2$ gas to be stored by formation of FeTi hydride. It has been found, however, that in order to obtain an adequate taking-up of $H_2$ and/or $D_2$ in a granulate of this known type, activation of the granulate must first be performed. For such activation, the granulate is heated in a hydrogen atmosphere and thereafter subject to evacuation. As a consequence of this activation, microcracks are produced in the granulate, having oxide-free surfaces for picking up hydrogen and/or deuterium into the alloy. If then $H_2$ and/or $D_2$ gas of a technical grade of purity is introduced into the granulate, hydrogen and/or deuterium penetrate and diffuse into the granules, and the impurities, principally oxygen and nitrogen, accumulate in the remainder gas outside the granules. By then releasing the impure remainder gas, it is possible to store $H_2$ or $D_2$ of high purity or, in case deuterium and hydrogen are both stored together in the granulate, to obtain a mixture containing $H_2$, $D_2$ and HD. In this connection, reference may be had, in addition to the above-identified copending patent applications, to "Technical Information No. 6" (1976) of Kernforschungsanlagen Jülich GmbH and German published patent application No. 26 07 156.

From a publication of G. Strickland et al, entitled "Operating Manual for the Hydrogen Reservoir Containing Iron-Titanium Hydride", Brookhaven National Laboratory, BNL 50421, Upton, New York, 1974, it is known to admix 1 to 2% by weight of manganese in place of iron in the iron-titanium alloy, and thereby to counteract the effect of a high oxygen content in the alloy. Oxygen drastically deteriorates the storage capability of the alloy by the formation of oxide. The inconvenient and expensive activation phase of the granulate before its use as a storage material is still a disadvantage in this case, however.

SUMMARY OF THE INVENTION

It is an object of the present invention to provide an alloy granulate for use in a pressure container for the taking-up and storage of hydrogen and/or deuterium that has a high storage capability without requiring any special activation procedure.

Briefly, an oxygen content is incorporated in the FeTiMn alloy in an atomic ratio to the manganese content of the alloy which lies in the range of 1:3 to 1:3.5 and the titanium content of the alloy is so determined that the titanium not bound by metal oxide formation has an atomic ratio to the iron not bound by oxide formation of Ti:Fe$\geq$1:1 and the combined iron and titanium content of the iron-titaniummanganese alloy lies in the range from 90 to 95% by weight. The invention is based upon the discovery that although the presence of oxygen in the alloy, on the one hand, reduces the storage capacity of the alloy, on the other hand an embrittlement of the granulate occurs with increasing oxygen content which favors the activation process. In a granulate according to the invention, metal oxides, particularly $Mn_2Ti_4O$ and $Mn_7Ti_{11}O_2$ are produced in the oxygen-containing FeTiMn alloy and utilized for producing microcracks. The alloy components of the complex system are so adjusted that the titanium and iron quantities not bound in metal oxides have a Ti:Fe ratio not less than 1:1, which is to say that the unbound titanium remains at least equal to the unbound iron content and may be in some excess. The oxygen content of the alloy is determined in relation to the manganese content in order to avoid the formation of iron-containing oxides. The granulate of this very brittle alloy is activated in a hydrogen atmosphere at room temperature, saving the expensive heating process previously required and has a capability of taking up hydrogen which lies between 92 and 95 atomic percent.

Preferably, the manganese content of the FeTiMn alloy lies in the range from 1.4 to 2.4 atomic percent and the oxygen content lies in the range from 0.4 to 0.8 atomic percent, while 52 to 55 atomic percent consists of titanium and iron provides the remainder, except for residual impurities not exceeding 1% by weight. Optimum results are obtained when the manganese content is 2% by weight, the oxygen content 0.4% by weight, the titanium content in the range of 49 to 51% by weight, with iron producing the remainder of the composition of the granulate, except for residual impurities less than 1% by weight. The alloy takes up between 92 and 94 atomic percent of hydrogen and/or deuterium and activates without heating in a hydrogen atmosphere at a pressure of about 60 bar, in a period of up to 20 hours. Activation succeeds already in a period of between two and four hours in the case of a granulate of which the granules having a particle size such that their diameter is in the range between 0.1 and 1.0 mm.

The storage device in which the granulate of the present invention is used is a pressure container that is gas-tight at high vacuum and preferably at ultra-high vacuum in which the granulate is placed as a loose filling, the container being equipped with a valve interposed in at least one connection line for opening and closing it. Even though heating is not necessary for activation of the granulate of the present invention, the container should be equipped with a heat exchanger accessible from the outside for circulation of the heat exchange medium for temperature control, on account of the heat developed or absorbed by the decomposition or formation of hydrides, as well as changes in gas pressure during filling with gas or release of gas.

DRAWING.

The invention is further described with reference to the annexed drawing which illustrates apparatus for storage of hydrogen and/or deuterium in accordance with the present invention.

DESCRIPTION OF AN ILLUSTRATIVE EMBODIMENT

The pressure container 1 illustrated in the drawing contains as a loose filling 2 a granulate of an oxygen-containing FeTiMn alloy. The container 1 is made of stainless steel or of a high-strength aluminum alloy and is designed for pressures up to 100 bar. A connection pipe 3 is provided for the container 1 for a gas line 4 in which a valve 5 is interposed. For monitoring the gas pressure inside the pressure container 1, a manometer 6 is provided in the illustrated embodiment connected with the inside of the pressure container 1 by a tube branching off from the connection pipe 3. The manometer could also be located elsewhere, for example at the outer end of the gas line 4. The casings of the pressure container, of the connection pipe 3, valve 5, manometer 6 and their connections to the gas lines are of a construction that is tight at high vacuum and preferably also at ultra-high vacuum. Tightness against ultra-high vacuum means rates of leakage below $10^{-10}$ mbar.e.-sec$^{-1}$.

Ultra-high-vacuum-tight construction of the gas container 1 is required in order to prevent access of foreign gas components into the inner space of the container during long-term storage of hydrogen and/or deuterium in the container. Such construction, furthermore, makes it possible to carry out the activation of the granulate and its reactivation within the gas container. The granulate consists of an FeTiMn alloy having between 1.4 and 2.4 atomic percent Mn, between 0.4 and 0.8 atomic percent $O_2$, between 52 and 55 atomic percent Ti and the remainder Fe, except for residual impurities not exceeding 1% by weight. The alloy components of the complex system of the composition are so determined that along with double oxides of manganese and titanium, FeTi constitutes 90 to 95% by weight of the composition, with 50 atomic % Fe and 50 atomic % Ti. The capability of the alloy to take up hydrogen is favored if Ti is somewhat in excess compared to Fe on an atomic basis, provided that the ratio Ti:Fe does not exceed 52:48 in atomic percent.

The granulate has a particle size of diameter not exceeding 2 mm, and for activation it is first evacuated in the pressure container down to a pressure below $10^{-1}$ bar before the gas mixture containing $H_2$ and/or $D_2$ is introduced for storage of hydrogen and/or deuterium. In the hydrogen and/or deuterium atmosphere, the granulate is taken up and stored at a pressure of 60 bar at room temperature for up to 20 hours. This initial filling provides the necessary activation. After activation in this manner, the granulate is suited for the taking up and giving off of $H_2$ and $D_2$ over long periods of operation.

A particular advantage is provided if a gas is introduced into the container that contains, along with hydrogen, also deuterium. In this case, a gas mixture consisting of $H_2$, $D_2$ and HD can be withdrawn from the granulate.

The granulate can be charged and discharged in the container 1 in the temperature range between about 30° C. and 80° C. and at equilibrium pressures corresponding to these temperatures which are in the pressure range between 2 and 80 bar. If the absorption capability of the granulate should fall off as the result of oxidation of the surfaces of the micropores and/or microcracks in the granulate, the activation step described above can be repeated for the granulate within the container 1.

The container 1 can be both filled and emptied by means of the valve 5. The manometer 6 serves for checking and monitoring the pressure within the container 1. A dust filter 7 is provided between the granulate-filled inner space of the container 1 and the gas line 4 that is designed to protect the valve seat of the valve 5 from particles entrained out of the granulate upon the withdrawal of gas upon evacuation of the container 1.

A serpentine tube 8 schematically represented in the drawing operates as a heat exchanger in the loose filling 2 of the container 1. This inserted tube can be equipped with heat-conducting fins, made, for example, of sheet copper, and it is provided with a supply pipe 9 and a discharge pipe 10 for circulation of a heat exchange medium for cooling or warming the filling tube. Water is preferably used as the cooling or heating medium. Cooling of the granulate is required when absorption of large quantities of hydrogen and/or deuterium in the metal lattice of the granulate within a short period of time heats the filling 2 with the released heat of absorption. Heating of the filling 2 is correspondingly necessary if large quantities of gas are quickly removed. This endothermic process in the withdrawal of gas from the storage device contributes decisively to the safety of the pressure container 1. In the case of an undesired break in the gas line 4, the escaping gas cools down the filling 2 quickly, so that with sinking equilibrium pressure, an automatic limitation of the escaping gas is produced.

The granulate can be activated in a very short time if it is composed of an FeTiMn alloy that contains 2% by weight of manganese, an oxygen content related to the manganese content as specified above, 49 to 51% by weight Ti and the remainder iron, except for residual impurities constituting less than 1% by weight. If the grain size of the granulate is such that the particle diameter lies between 0.1 and 1.0 Mn, then after evacuation of the container down to a pressure not greater than $10^{-1}$ mbar, followed by introduction of a gas mixture containing $H_2$, up to a pressure of 60 bar, activation times in the range between 2 and 4 hours can be obtained at room temperature. Between 92 and 94 atomic percent of hydrogen is taken up by the alloy. In a typical example, the residual impurities of the alloy were slight quantities of aluminum and chromium. A chemical analysis of the alloy in that case showed 0.5% by weight of aluminum and 0.1% by weight of chromium.

Upon introduction of $H_2$ or $D_2$ gas having a foreign gas content of at most 1%, a degree of loading of the granulate between 93 and 95 atomic percent could be obtained. In such cases the gas mixture in the container 1 was introduced at room temperature up to the establishment of a pressure of about 65 bar. Thereafter, a part of the gas content was released in sudden pulses until the pressure in the gas container was reduced from 65 bar to about 30 bar. With this release of gas, a high purification effect was obtained. The degree of purity of the gas then withdrawable from the vacuum-tight container, regarding the foreign gas content in the form of oxygen, nitrogen, hydrocarbons and the like, was improved by the factor of $2.10^3$ compared to the gas previously introduced. The loss of useful gas constituting the price of this purification amounted to merely about 5% by volume. Following this purification step, H$_2$ or D$_2$ gas with a degree of contamination less than 1 part per million could be withdrawn, which is to say a gas having 99.9999 percent by volume of H$_2$ or D$_2$.

In the preparation of suitable granulates for the practice of the invention, melting of the material by inductive heating in an aluminum crucible is to be recommended. In such crucibles, because of the chemical composition of the crucible material, no supplementary oxygen supply is necessary. The oxygen content in the alloy thus prepared is regulated by the period of melting. Suitable control of the melting time to obtain the desired oxygen content can readily be established by test runs in which oxygen content is measured by analysis for different periods of time in the molten state in the crucible. It is not practical to prescribe the melting time for the general case, because the size and shape of the crucible and the relation between the area of the surface exposed to air to the volume of the melt affect the rate at which oxygen is taken into the alloy.

Although the invention has been described in greater detail with respect to a particular illustrative example, it will be understood that variations and modifications are possible within the inventive concept.

We claim:

1. In a granulate-filled pressure chamber for storage of hydrogen, deuterium or both hydrogen and deuterium or for combining hydrogen and deuterium as HD, an iron-titaniummanganese alloy granulate filling for said chamber having the improvement which consists in that the granulate filling is activatable without externally supplied heat at ambient room temperature and has an oxygen content in atomic ratio of from 1:3 to 1:3.5 to the manganese content of the FeTiMn alloy and the titanium content is such that the atomic ratio of titanium not bound in metal oxides to unbound iron is not less than 1:1, while the FeTiMn alloy has a Fe-Ti content of 90 to 95% by weight.

2. A granular filling for a pressure chamber as defined in claim 1, in which said FeTiMn alloy has a content of manganese of between 1.4 and 2.4 atomic %, an oxygen content of between 0.4 and 0.8 atomic % and a titanium content of between 52 and 55% by weight, the remainder being iron except for impurities constituting less than 1% by weight.

3. A granular filling as defined in claim 1, in which the granules are of a mean diameter between 0.1 and 1 mm.

4. A granular filling in a pressure chamber as defined in claim 1, wherein said pressure chamber is equipped with valve means for opening and closing the path to a connection pipe and with heat exchanger passing through the bed of said granulate filling and having external connections for circulation of a heat exchange medium therethrough.

* * * * *